United States Patent
Miller et al.

[11] Patent Number: 5,964,403
[45] Date of Patent: *Oct. 12, 1999

[54] AUTOMATED ELECTRONICALLY CONTROLLED MICROSPRAYER

[75] Inventors: James Ray Miller, Williamston; Michael John Ulczynski, Okemos; Brian L. Wright, Mason, all of Mich.

[73] Assignee: Board of Trustees operating Michigan State University, East Lansing, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,429

[22] Filed: Apr. 22, 1997

[51] Int. Cl.⁶ .............................. B05B 17/00; A01G 27/00
[52] U.S. Cl. ................................. 239/1; 239/69; 239/373; 239/584; 239/70; 222/399; 222/646
[58] Field of Search .................................. 239/67, 69, 70, 239/5, 152, 373, 584, 585.1; 222/399, 646, 649; 251/129.09, 129.15, 129.21

[56] References Cited

U.S. PATENT DOCUMENTS

| | | |
|---|---|---|
| 2,289,310 | 7/1942 | Steel ............................... 251/129.21 X |
| 2,524,796 | 10/1950 | Higgins . |
| 3,305,134 | 2/1967 | Carmichael et al. . |
| 3,523,646 | 8/1970 | Waldrum . |
| 3,627,205 | 12/1971 | Healy . |
| 3,667,673 | 6/1972 | Knudsen . |
| 3,926,369 | 12/1975 | Pearce . |
| 4,272,019 | 6/1981 | Halaby, Jr. . |
| 4,473,186 | 9/1984 | Alperin . |
| 4,671,435 | 6/1987 | Stout et al. . |
| 4,852,802 | 8/1989 | Iggulden et al. ..................... 239/70 X |
| 4,909,439 | 3/1990 | Fu ..................... 239/585.5 X |
| 5,048,755 | 9/1991 | Dodds .................. 239/70 X |
| 5,074,443 | 12/1991 | Fujii et al. ......................... 222/399 X |
| 5,074,468 | 12/1991 | Yamamoto et al. . |
| 5,208,855 | 5/1993 | Marian . |
| 5,232,167 | 8/1993 | McCormick et al. ............... 239/585.5 |
| 5,244,180 | 9/1993 | Wakeman et al. ............... 239/585.5 X |
| 5,289,627 | 3/1994 | Cerny et al. ................... 239/585.5 X |
| 5,476,226 | 12/1995 | Tomiita et al. ..................... 239/585.5 |
| 5,483,944 | 1/1996 | Leighton et al. ...................... 123/531 |
| 5,570,813 | 11/1996 | Clark, II .......................... 222/399 X |

FOREIGN PATENT DOCUMENTS 220332  5/1997  European Pat. Off. ............... 222/646

*Primary Examiner*—Andres Kashnikow
*Assistant Examiner*—Steven J. Ganey
*Attorney, Agent, or Firm*—Ian C. McLeod

[57] ABSTRACT

An electronically controlled micro-dispensing apparatus (10 or 210) is described. The apparatus includes a liquid storage container (12), a propellant container (16), a control circuit (34 or 42) and an ejector (28). In a second embodiment, the liquid and propellant are in the same container (212). The control circuits control the length of pulse and the time duration between each pulse. By controlling these factors, the apparatus dispenses a precise amount of liquid over a set time period. The ejector allows for controlled dispensing and allows the liquid to be sprayed a greater distance. In the preferred embodiment, the apparatus are used to dispense a pheromone in an outdoor setting, such as an orchard, to control insects.

39 Claims, 8 Drawing Sheets

AUTOMATED ELECTRONICALLY CONTROLLED MICROSPRAYER

GOVERNMENT RIGHTS

This invention was developed under United States Department of Agriculture Grant No. (O.R.D.) 65024 and Amendment 58-1931-5-030. The Federal government has certain rights in the invention.

BACKGROUND OF THE INVENTION (1) Field of the Invention

The present invention relates to an apparatus for periodically dispensing a fluid over an area by spraying. In particular, the present invention relates to an apparatus for electronically controlling the periodic spraying of a liquid in controlled amounts over a specified area. The present invention particularly relates to an electronic micro-dispensing apparatus for spraying pheromones in controlled amounts for a short duration in timed intervals to control insects in an outdoor setting such as an orchard.

(2) Description of the Related Art

The patent art has shown various types of automatic dispensing systems and apparatus. Illustrative are U.S. Pat. Nos. 3,627,205 to Healy; 4,272,019 to Halaby. Jr.; 4,671,435 to Stout et al and 5,074,468 to Yamamoto et al. In addition, U.S. Pat. Nos. 2,524,796 to Higgins; 3,667,673 to Knudsen and 3,926,369 to Pearce show spraying apparatuses which spray automatically in response to a specific environmental condition.

U.S. Pat. No. 4,671,435 to Stout et al describes a solenoid operated valve. The problem is that the nozzle and the valve are not joined together as in a fuel injector. The result is that there is less precision in the metering of the fluid to be sprayed.

In particular, U.S. Pat. No. 4,473,186 to Alperin describes a method and apparatus for spraying aerosols comprising small liquid or solid particles as fine mist over large distances on the order of 120 ft while using minimal amounts of energy. The method and apparatus utilize the property of the ejector normally employed for moments or thrust ignition for dispersement of the liquid and solid aerosols over large distances with large divergence angles. The apparatus and method cause the substance to be sprayed to mix with a high velocity jet, thus causing an acceleration of the substance in the desired direction utilizing the drag force for projection over large distances rather than for deceleration and small spray distances.

Further, U.S. Pat. No. 3,305,134 to Carmichael describes an automatic spray device which will automatically and periodically dispense a compressed fluid. The device is used in connection with a pressure pack or aerosol container. The device comprises regulator valve mechanics connected to the pressure pack for regulating the exit flow of the propellant contained in the pressure pack and a diaphragm type valve in a chamber. The diaphragm type valve controls the flow of the fluid. When the propellant from the pressure pack accumulates and provides a proper pressure on the diaphragm valve, the valve will open, thus spraying the fluid. The device can be constructed with a separate container for the propellant or the fluid and propellant can be combined in the same container.

U.S. Pat. No. 3,523,646 to Waldrum describes a liquid sprayer which discharges the liquid in a direction opposite the direction of movement of the nozzle. The movement and direction of flow causes the uniform formation of droplets, which reduces the problem of drift.

In the past, pheromones for disruption of insect chemical communication have been released from impregnated solids like rubber and plastic in sizes ranging from sprayed microcapsules to foot-long strips hung on trees, open-ended hollow fibers where evaporation rate is controlled by size of the openings, and hollow polyethylene tubes having their lumen filled with chemical and heat-sealed at the end. Release rate from these "ropes" or other such releasers having an undiluted chemical reservoir is most preferably constant until the reservoir is exhausted.

A disadvantage of the above-mentioned dispersers is that they are perpetually "on" once deployed and cannot retain their chemical during periods when, due to pest life cycle, there may be no need to dispense the chemical. Dispensing the chemical only when needed is something that is economically desirable. Within the past two years, applied entomologists have adapted automatic aerosol dispensers to surmount this problem of wasting precious volatile chemicals by dispensing them indiscriminately over time. Automatic aerosol dispensers are used to dispense or sometimes fumigants for insect pest control at timed intervals. At the intervals (e.g., 30 min. interval) a battery-powered motor turns gears attached to a lever that depresses the valve of an aerosol can, emitting a short pulse of can contents. Because many moth pests mate only at night, the automatic aerosol dispensers used for insect sex attractant release employ a photocell that precludes release in daylight. For this application, pheromone must be formulated with a propellant and packaged in a conventional spray can, which protects chemicals from exposure to the degradative factors of light and oxygen. The aerosol sprays onto a cloth pad from which is evaporates at a decreasing rate between pulses of spray.

Currently available are automatic aerosol dispensers which require a substantial amount of force (about 4 kg) to depress the aerosol can control valve. In addition, the mechanics and circuitry used to depress the aerosol control can valve on existing models are not maximally efficient and hence are more expensive than necessary. Furthermore, expensive and specialized equipment is required to charge or recharge an aerosol can. The currently available aerosol dispensers also have limited flexibility in control of their release of chemicals.

There remains the need for an electronically controlled micro-dispensing apparatus which allows for controlling the duration and amount of the spray as well as the time interval between spraying and which is economical to manufacture and operate.

OBJECTS

It is therefore an object of the present invention to provide an electronically controlled micro-dispensing apparatus which has user adjustable control circuitry to allow for dispensing of the chemical at various time intervals and in varying amounts. Further, it is an object of the present invention to provide an electronically controlled micro-dispensing apparatus which has sensors external of the control circuit to sense environmental conditions such as temperature and wind speed in order to control the release of the chemical to correspond with the periods of insect mating or other insect activities. Still further, it is an object of the present invention to provide an electronic micro-dispensing apparatus in which the storage container having the fluid to be dispensed is rechargeable by the user. Further still, it is an object of the present invention to provide an electronically controlled micro-dispensing apparatus which operates on batteries over a long period of time. Further, it is an object of the present invention to provide an electronically controlled micro-dispensing apparatus which can propel the fluid a significant distance from the dispensing apparatus. It is further an object of the present invention to provide an electronically controlled micro-dispensing apparatus which is inexpensive to manufacture and which requires low maintenance. These and other objects will become increasingly apparent by reference to the following drawings and the description.

DETAILED DESCRIPTION OF THE PREFERRED EMBODIMENTS

Figure 1:
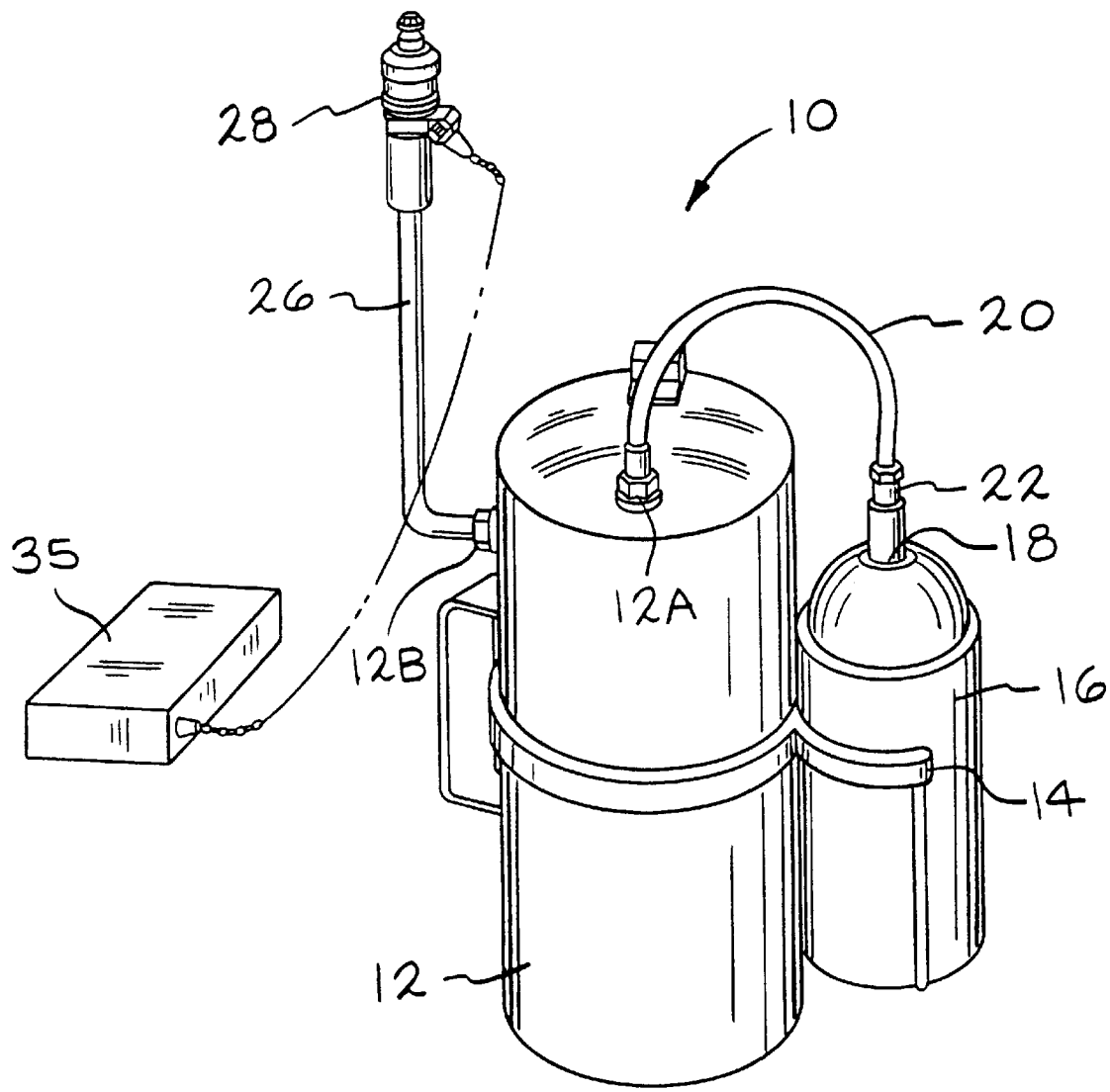
FIG. 1 is a perspective view of a first embodiment of the spraying apparatus 10 illustrating the liquid container 12, the propellant container 16 and the control box 35 connected to an ejector nozzle 28.

The present invention relates to a dispenser apparatus for controlled dispensing of a chemical periodically which comprises: a sealed container means having an inlet and an outlet and which is configured to hold a pressurized gas; an adaptor means mounted on the inlet which allows the pressurized gas to be provided in the container means; a nozzle means connected to the outlet of the container means, wherein the nozzle means comprises: a body with a passage therethrough; a valve needle moveable in the passage of the body to open and close the passage; a solenoid coil with electrical leads, the coil which provides a continuous circuit surrounding the valve needle so that the needle is moved upon application of a current through the coil; and a bias means which holds the valve needle in a closed position when the current is not applied through the coil; and a control means which supplies current to the coil to move the valve needle against the bias means to open the passage in the body of the nozzle means and allows the chemical and the gas to be dispensed periodically from the container means through the passage in the body of the nozzle means.

Further, the present invention relates to a system for periodically dispensing a chemical over an area which comprises: multiple dispenser apparatus each dispenser apparatus comprising a sealed container means and having an inlet and an outlet which can hold a pressurized gas; adaptor means mounted on the inlet which allows the pressurized gas to be provided in the container; a nozzle means connected to the outlet of the container means, wherein the nozzle means comprises: a body with a passage therethrough; a valve needle moveable in the passage of the body to open and close the passage; a solenoid coil with electrical leads to the coil which provide a continuous circuit surrounding the valve needle so that the needle is moved upon application of a current through the coil; and bias means which holds the valve needle in a closed position when the current is not flowing through the coil; control means which supplies current to the coil means to move the valve needle against the bias means to open the passage in the nozzle means and allow the chemical and the gas to be dispensed periodically from the container means through the passage in the body of the nozzle means; and a central processing unit as part of the control means which controls each of the multiple dispenser apparatus so that each dispenser apparatus periodically dispenses the chemical from the nozzle means.

Still further, the present invention relates to a method for dispensing a chemical which comprises: providing a dispenser apparatus; a sealed container means having an inlet and an outlet and which can hold a pressurized gas; adaptor means mounted on the inlet which allows a pressurized gas to be provided in the container means; a nozzle means connected to the outlet of the container, wherein the nozzle means comprises: a body with a passage therethrough; a valve needle moveable in the passage of the body to open and close the passage; and a solenoid coil with electrical leads to the coil which provide a continuous circuit surrounding the valve needle so that the needle is moved upon application of a current through the coil; and bias means which holds the valve needle in a closed position when the current is not flowing through the coil; and control means which supplies current to the coil means to move the valve needle against the bias means to open the passage in the nozzle means and allow the chemical and the gas to be dispensed periodically from the container means through the passage in the body of the nozzle means; and periodically dispensing the chemical through the nozzle means upon supply of current to the coil of the nozzle means.

Further still, the present invention relates to a timing circuit for supplying current to a load which comprises: a first control transistor of the NPN type having a gate and first and second leads in an electrical circuit; the first lead being a collector which is connected to the load from a power source of the circuit; and the second lead being an emitter which is connected to a ground of the circuit, with a control lead between the first and second leads which is a gate and opens and closes current flow through the load from the power source to the ground; and a subcircuit with a capacitor electrically connected to a lead of a gate of a second transistor of the PNP type with leads allowing a voltage and current to be applied from the power source to the gate of the first transistor, wherein the capacitor charges via a current from the gate of the second transistor and when the capacitor is charged it prevents current from flowing through the second transistor to the gate of the first transistor and forces the first transistor to turn off which causes the voltage from the power source plus the voltage of the capacitor to be applied to the gate of the second transistor holding it in an off state until the voltage applied to the gate of the second transistor bleeds down below a voltage of the power source so that current leaks through the second transistor to the first transistor allowing the first transistor to begin to turn on thereby starting current flowing through the load and thus reducing a voltage bias applied to the capacitor by the first transistor and wherein as the voltage bias to the capacitor is reduced, all currents increase and the capacitor begins a new charge cycle whereby the timing of the current to the load is provided.

FIG. 1 shows the first embodiment of the apparatus 10 of the present invention. The apparatus 10 includes a liquid storage container 12, a propellant container 16 and a control circuit 34 or 42. The liquid storage container 12 is preferably a standard liquid container having an inlet 12A and an outlet 12B. The inlet 12A allows for filling or refilling the container 12 with the liquid. In the first embodiment, the liquid and propellant are stored in separate containers. The liquid storage container 12 preferably has a bracket 14 which allows for removably mounting the propellant container 16 on the liquid storage container 12. The separate propellant container 16 enables the user to easily purchase and replace the propellant with commercially available propellant containers.

The liquid storage container 12 preferably holds about 32.0 ounces of the liquid which is preferably enough for one (1) growing season. However, the size of the container 12 can be adjusted depending on the size of the area to be treated and the time period over which the apparatus 10 is to operate. The storage container 12 is preferably constructed of an inert metal such as stainless steel, brass or aluminum.

In the first embodiment, the propellant container 16 is a standard propellant container 16 having a single inlet/outlet 18 which allows the container 16 to be charged with the propellant. The inlet/outlet 18 is connected by an airtight hose 20 to the inlet 12A of the liquid storage container 12. In the preferred embodiment, the hose 20 is flexible to allow for easier connecting and disconnecting of the containers 12 and 16. The inlet/outlet 18 of the propellant container 16 is provided with a shut off, one way check valve 22 which allows the propellant container 16 to be detached from the airtight hose 20 connected to the liquid storage container 12 without loss of propellant. In addition, the shut off, one way check valve 22 also prevents the liquid from the container 12 from entering the propellant container 16 and from escaping the liquid storage container 12 when the propellant container 16 is disconnected. The propellant container 16 preferably holds about 8.0 ounces of propellant. However, it is understood that the size of the propellant container 16 is directly related to the amount of liquid to be dispensed. The propellant can be either a gas or a liquid. In the preferred embodiment, the propellant is difluoroethane filtered to 0.1 micron; however, any other well known propellant can be used. The propellant container 16 is preferably similar to those well known in the art.

Figure 6:
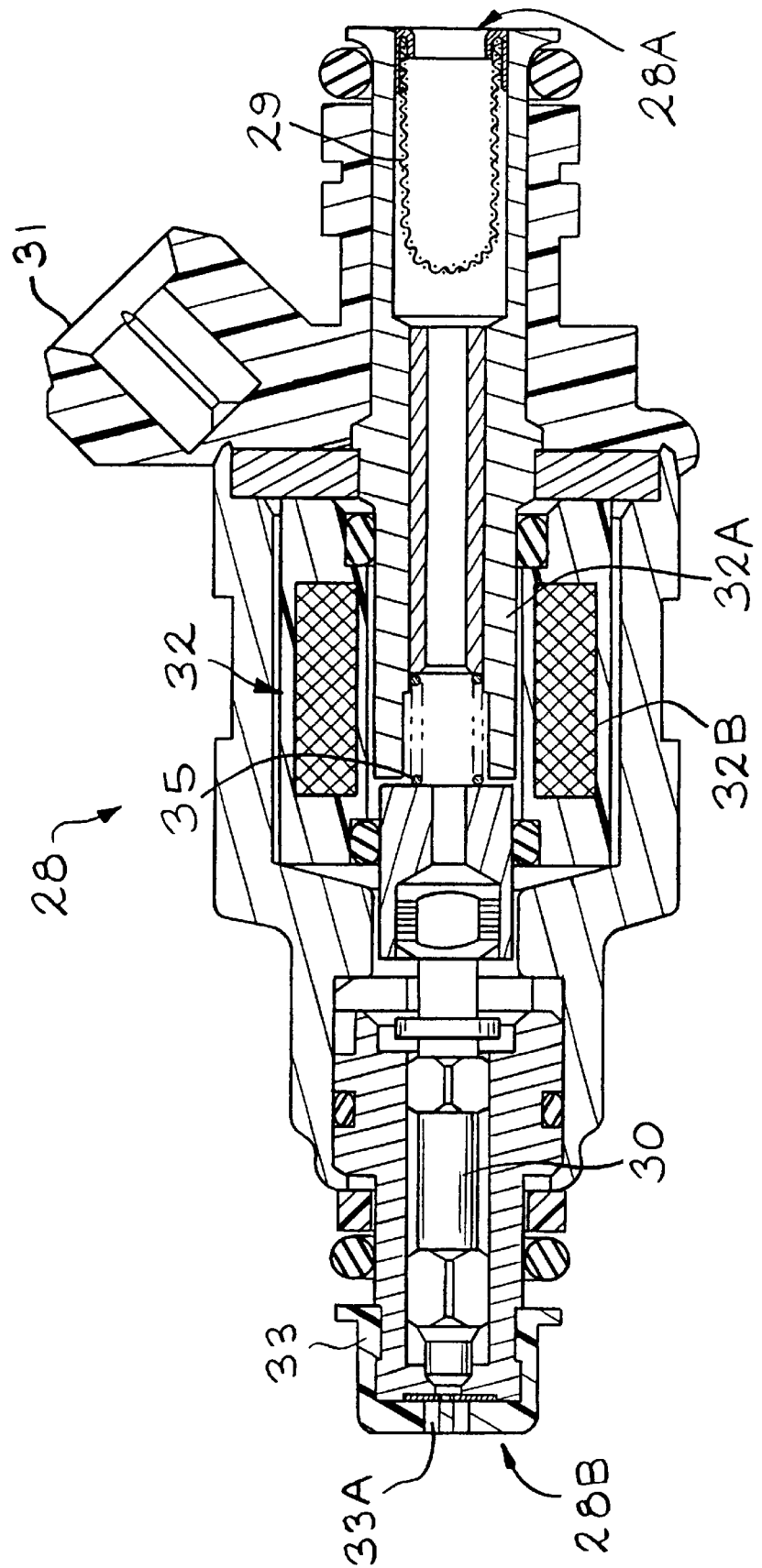
FIG. 6 is a front cross-sectional view of a solenoid controlled ejector nozzle 28 according to the present invention which is closed when no current is flowing through the solenoid 32.

The outlet 12B of the liquid storage container 12 is connected by a second airtight hose 26 to an ejector nozzle 28. In the preferred embodiment, the ejector nozzle 28 includes an inlet 28A having an integral filter 29, an electrical connector 31, a solenoid 32 having an armature 32A, a coil 32B and a valve mechanism with a valve needle or pintle 30. The inlet 28A of the ejector nozzle 28 is connected to the second airtight hose 26. In the preferred embodiment, the second hose 26 is rigid such as to hold the ejector nozzle 28 in a fixed position spaced above the liquid storage container 12. Alternatively, the hose 26 is slightly flexible to allow for positioning the ejector nozzle 28 in a certain direction. The ejector nozzle 28 is activated and controlled by a control circuit 34 or 42. The control circuit 34 or 42 is connected to the electrical connector 31 of the ejector nozzle 28. The pintle 30 preferably has a stainless steel body and which is moved into the "open" position by the solenoid 32 located in the base of the ejector nozzle 28 (FIG. 6). Preferably, when the solenoid 32 is activated, the solenoid 32 moves the pintle 30 into the open position which allows the liquid and propellant in the ejector nozzle 28 and the second airtight hose 26 to be expelled from the ejector nozzle 28. Once the solenoid 32 is deactivated, a spring 37 acts to move the pintle 30 into the "closed" position. When activated, the ejector nozzle 28 preferably ejects a stream of the liquid through the outlet 28B of the ejector nozzle 28. The outlet 28B of the ejector nozzle 28 preferably has a protection cap 33. The protection cap 33 preferably has at least one small orifice 33A which enables the ejector nozzle 28 to propel the liquid a greater distance in a stream. In the preferred embodiment, the protection cap 33 has four orifices 33A (FIG. 6). The amount of liquid delivered by the ejector nozzle 28 depends on how long the ejector nozzle 28 remains in the open position. The ejector nozzle 28 is preferably a pintle type injector similar to those used as fuel injectors for automotive vehicles. Alternately, a ball type injector or a disc type injector can be used. Controlling the pintle 30 of the ejector nozzle 28 allows a precise amount of the liquid to be ejected during one pulse. In the preferred embodiment, the ejector nozzle 28 is a fuel injector (port injection) similar to the model 0 280 150 718 manufactured by Robert Bosch.

Figure 4:
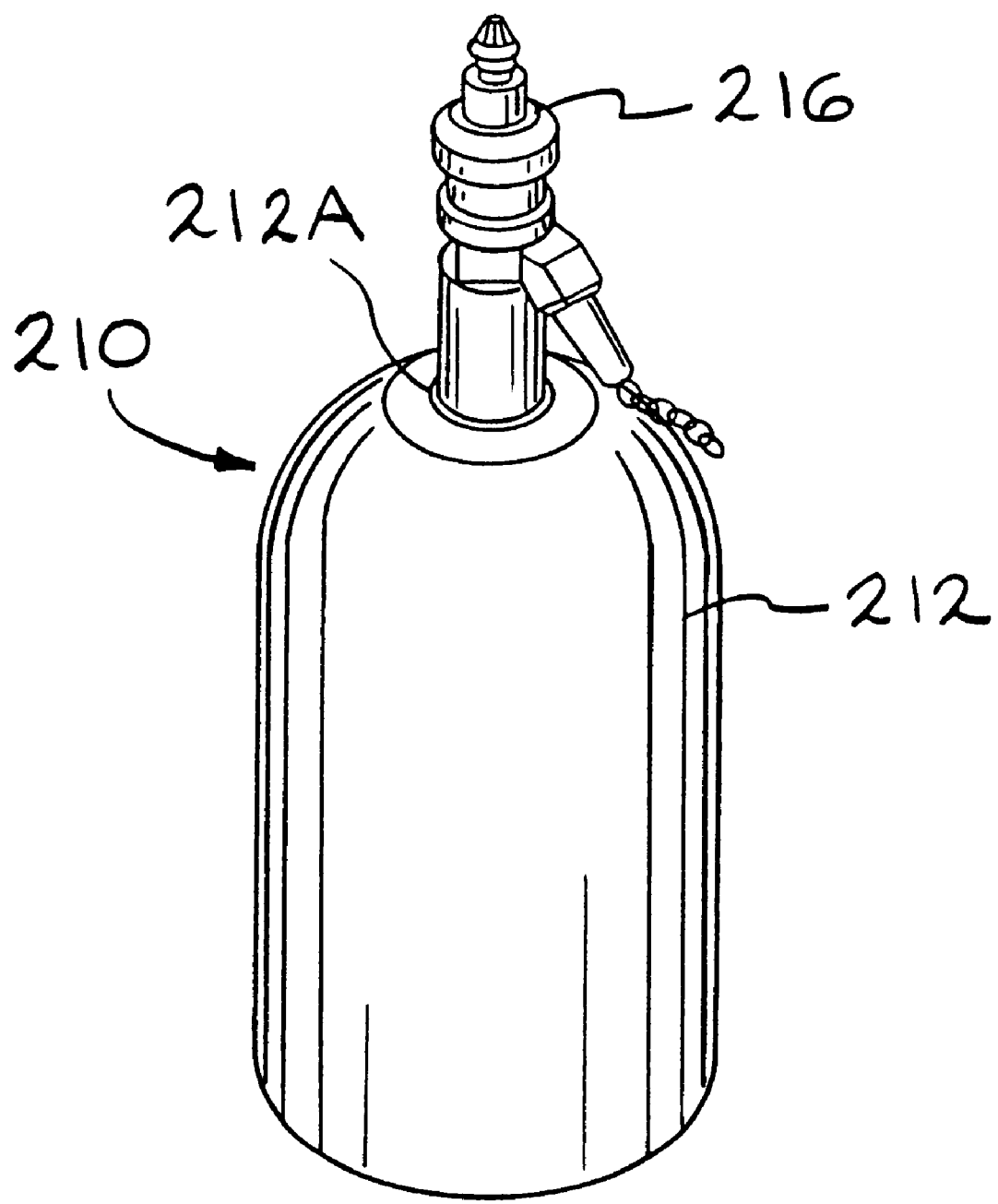
FIG. 4 is a perspective view of a second embodiment of the apparatus 210.

In the second embodiment as shown in FIG. 4, the liquid and the propellant of the apparatus 210 are in the same container 212. The container 212 is preferably provided with an outlet 212A which allows for filling the container 212 with the liquid and the propellant. The container 212 is preferably able to be recharged with a propellant such as $CO_2$ or $N_2$. The outlet 212A is connected to an ejector 216. The ejector nozzle 216 is preferably similar to that used in the first embodiment.

Figure 2:
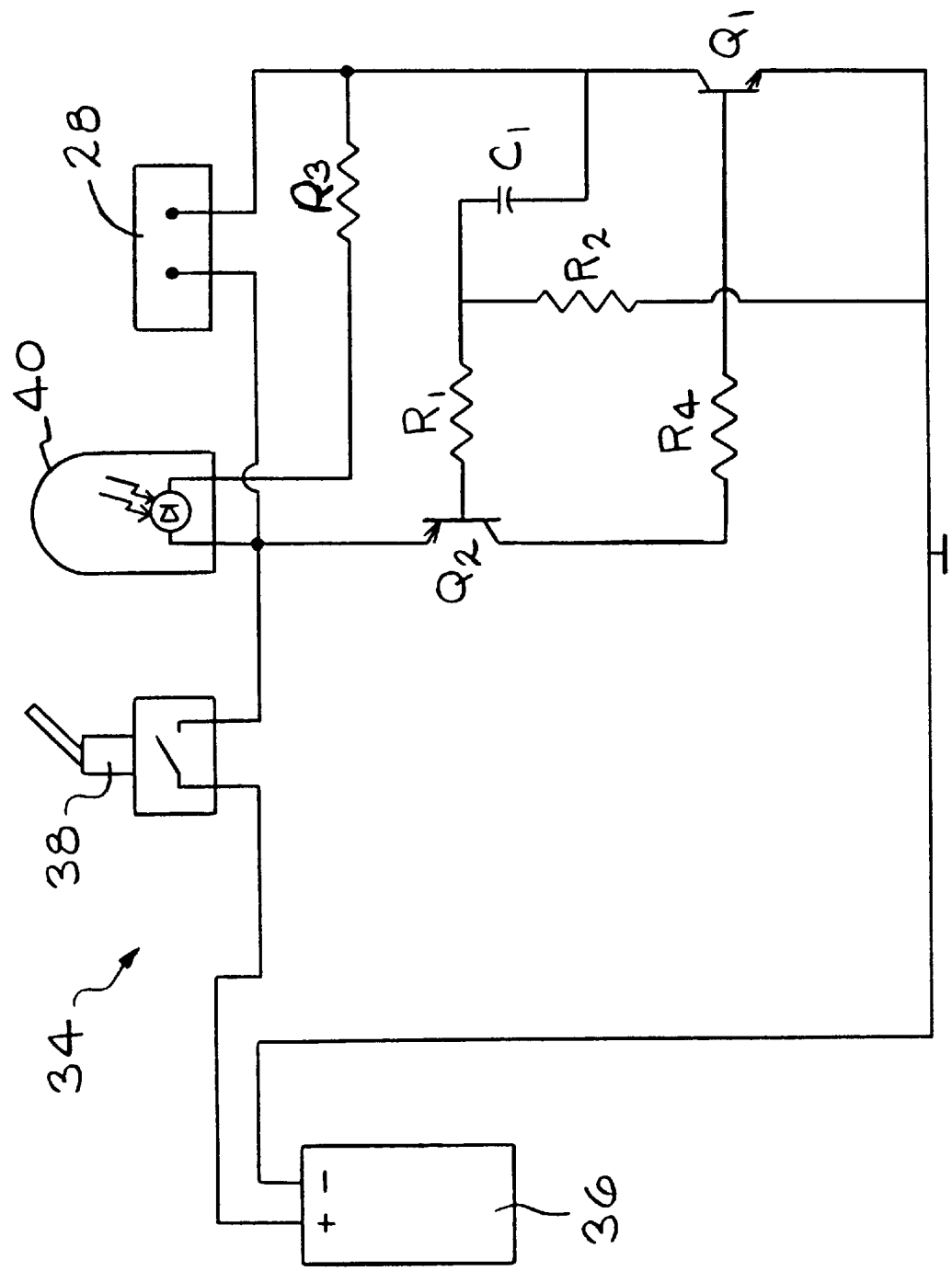
FIG. 2 is the timer control circuit 34 of the first embodiment of FIG. 1.

In the first or second embodiments, the ejector nozzle 28 or 216 is preferably controlled by a first control circuit 34 as shown in FIG. 2. The circuit 34 is preferably mounted in a weatherproof, watertight box 35 which allows the circuit 34 to be used and left out of doors. The circuit 34 uses a capacitor $C_1$ in combination with transistors $Q_1$ and $Q_2$ and resistors $R_1$, $R_2$, $R_3$ and $R_4$ to create a low power, timing circuit for activating and deactivating the ejector nozzle 28 of the apparatus 10 or 210. Preferably, the first control circuit 34 includes a power source 36, a switch 38, a capacitor $C_1$, a pair of transistors $Q_1$ and $Q_2$ and resistors $R_1$, $R_2$, $R_3$ and $R_4$. The power source 36 preferably is a 9 V source such as either a 9 V battery or six (6) AA, 1.5 V batteries. The switch 38 is preferably a standard "on", "off" switch. An LED 40 is preferably included in the circuit 34 to indicate that the solenoid 32 has been activated by the circuit 34. Preferably, when the solenoid 32 is activated, the LED 40 is flashed to clearly indicate that the apparatus 10 is functioning. In general, in the first control circuit 34, when the capacitor $C_1$ has discharged, current is allowed to flow in the circuit 34 which activates the solenoid 32 to "open" the valve 30 of the ejector nozzle 28 to dispense the liquid. When the capacitor $C_1$ is fully charged, the capacitor $C_1$ prevents current from flowing in the circuit 34 and in the solenoid 32 which in turn deactivates the solenoid 32 of the ejector nozzle 28 or 216 which allows the spring 30B to move the valve needle 30A of the valve 30 of the ejector nozzle 28 or 216 into the "closed" or "off" position which causes the ejector nozzle 28 to stop dispensing the liquid. In the preferred embodiment, the first transistor $Q_1$ is a 3704 NPN transistor and the second transistor $Q_2$ is a 4403 PNP transistor. The capacitor $C_1$ preferably has a value of 100 $\mu$F. However, the value of $C_1$ can be varied depending on the desired duration of the period of operation of the apparatus 10. In the preferred embodiment, the first resistor $R_1$ has a value of 20 $\Omega$. However, the first resistor $R_1$ is preferably removably mounted in the circuit 34 through use of a component socket. The first resistor $R_1$ is intended to be easily changed to allow for easily adjusting the timing of the circuit 34. In the first control circuit 34, lowering the value of $R_1$ causes the capacitor $C_1$ to charge faster, which results in reducing the duration the ejector nozzle 28 or 216 is "on". However, this current is limited by $I_{EB\ MAX}$ in the circuit 34 which is a function of $Q_1$, $Q_2$ and the load of the ejector nozzle 28. The second and fourth resistors $R_2$ and $R_4$ preferably have a value of 2 m$\Omega$ and 560 $\Omega$, respectively. The value of $R_4$ controls the "on" duration of the ejector nozzle 28 or 216. The greater the value of $R_4$, the smaller the current in the ejector nozzle 28 or 216. As the value of $R_4$ is increased, the time span between activation of the ejector nozzle 28 and deactivation of the ejector nozzle 28 decreases. $R_4$ is not required unless the required ejector "on" duration is less than the fastest capacitor charging time which is when $R_1$=0$\Omega$. The value of $R_4$ is also a function of the gas pressure of the apparatus 10. For higher pressures, longer currents are required to open the nozzle 28. A smaller $R_4$ compensates this larger current. The first control circuit 34 enables the ejector nozzle 28 or 216 to have an "on" cycle period or pulse duration of between about 2 msec and about 1 sec. The time between pulses is preferably between about 1 sec. and 300 sec. (5 min.). In the preferred embodiment, activating and deactivating the ejector nozzle 28 requires only nominal power which allows the apparatus 10 to operate for long periods of time without the need to replace the battery 36. Preferably, the battery 36 can operate the circuit 34 and control the dispensing of the liquid from the apparatus 10 for one (1) year. Current testing shows this circuit 34 can run for at least 6 months in the lab on a standard 9 V Duracell® battery. The testing is still on going.

Figure 3:
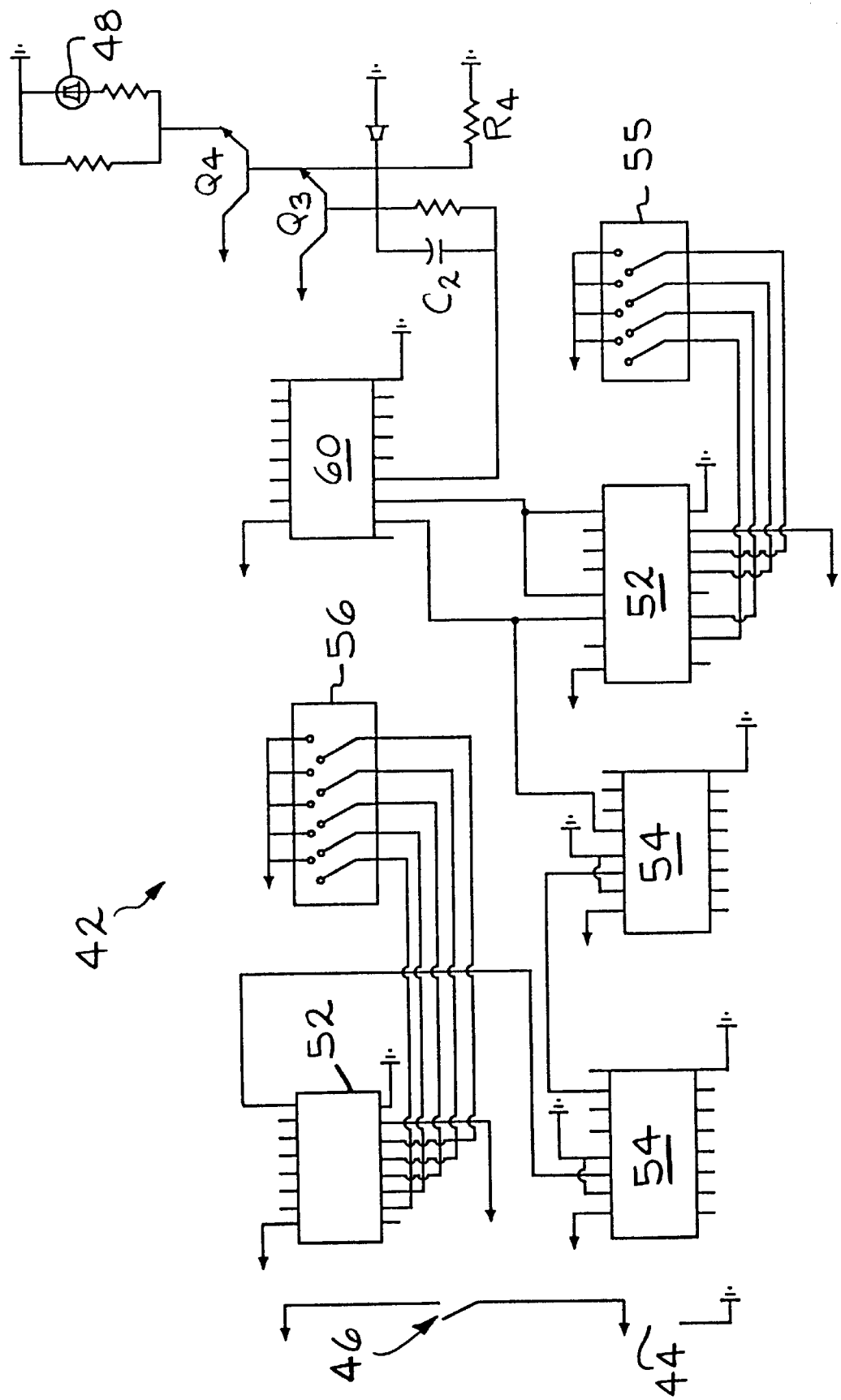
FIG. 3 is the timer control circuit 42 useful in the first embodiment or the second embodiment of FIG. 5.

In an alternate embodiment, a second control circuit 42, as shown in FIG. 3, is used to activate and deactivate the apparatus 10 or 210. The second control circuit 42 is programmable so that the user is able to specifically program the duration of the pulse of liquid and the time delay between each pulse for the apparatus 10 or 210. The second control circuit 42 allows for a wider variety of pulse durations and cycle periods. Preferably, the second control circuit 42 enables the ejector nozzle to have an "on" cycle period or pulse duration with a range of between about 5 msec and 15 sec. The time between pulses or between the activated mode and deactivated mode of the ejector nozzle 28 preferably has a range of between about 1 sec. and 12,000 sec. As with the first control circuit 34, the second control circuit 42 includes a power supply 44 which is preferably 9 V and is comprised of either a 9 V battery or six (6) 1.5 V AA batteries and a switch 46 which is preferably a standard "on"/"off" switch well known in the art. The circuit 42 also includes a pair of programmable oscillators 52, a pair of decade counters 54, an 8 position and a 16 position BCP coded Rotary dip switch 55 and 56 and a Quad XOR CMOS 60. The programmable oscillators 52 of the second control circuit 42 are preferably similar to the PXO-1000 manufactured by Statek of Orange, Calif. The decade counters 54 are preferably the CD4017 such as manufactured by National Semiconductor. The 8 position and 16 position BCP coded Rotary dip switches 55 and 56 are preferably similar to the 948-9002 and 948-9012 distributed by Allied located in Grand Rapids, Mich. The QUAD XOR CMOS 60 is manufactured by National Semiconductor. The circuit 42 also preferably has a 100 $\mu$F capacitor $C_2$, two NPN transistors $Q_3$ and $Q_4$ and a 580 $\Omega$ ¼ watt resistor $R_4$. As with the first control circuit 34, the second circuit can also be provided with an LED 48 to indicate the circuit is active. As with the first control circuit 34, the second control circuit 42 is preferably mounted in a weatherproof box (not shown).

Figure 7:
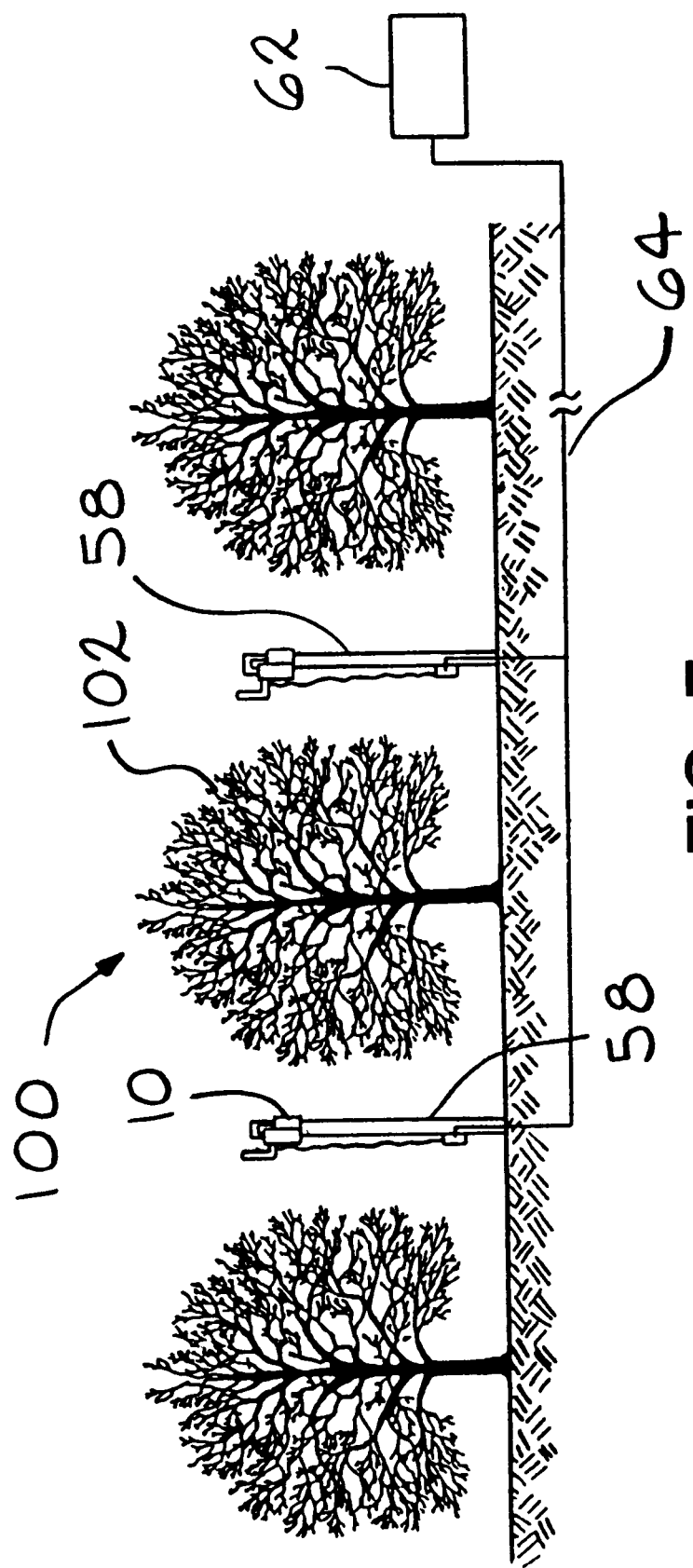
FIG. 7 is a front view showing use of the apparatus 10 in an orchard 100 with the apparatus 10 controlled by a single computer 62.
Figure 8:
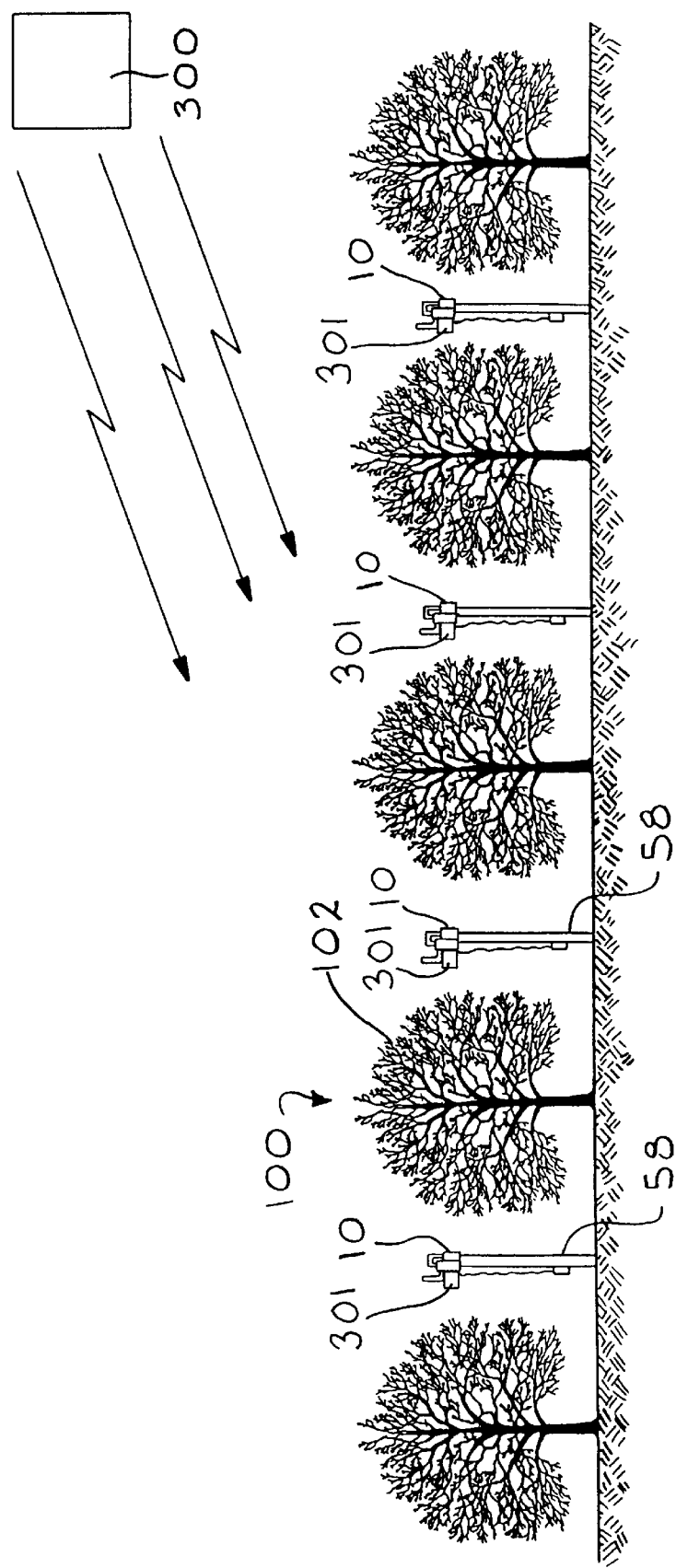
FIG. 8 is a front view showing use of the apparatus 10 in an orchard 100 with the addition of the transmitter 300 and receiver 301.

In another alternate embodiment, the apparatus 10 or 210 is, controlled by a remote electromagnetic wave transmitter 300, as shown in FIG. 8 such as through the use of radio frequency waves. In this embodiment the control is a remote electromagnetic wave transmitter 300 controlling a receiver 301 connected to the coil 32 of the nozzle 28 on the container 12. When activated by the transmitter 300 the receiver 301 allows current to flow to the coil 32 thus moving the needle valve ("pintle") 30 to open the outlet 28B in the orifice 33A in the nozzle 28. The spring 37 acts to move the pintle 30 to the closed position. The apparatus 10 or 210 could also be remotely controlled by a satellite (not shown). Such a system is described in U.S. Pat. No. 5,208,855 to Marian. In an additional alternate embodiment, several apparatuses 10 or 210 can be controlled as a single unit or separately by a computer 62 (FIG. 7). The individual apparatuses 10 or 210 can be individually connected to the computer 62 or the apparatuses 10 or 210 can be connected together and then connected to the computer 62 as a single unit. The computer 62 could have separate addresses and separate drivers for each apparatus 10 or 210 which would allow individualized control of each individual apparatus 10 or 210. The control circuit 34 or 42 of the apparatus 10 or 210 could be provided with sensors (not shown) for sensing environmental conditions such as temperature and wind speed which would allow the circuit to respond to different environmental conditions and control the release of the liquid. In the preferred embodiment, the sensors would allow the apparatus 10 or 210 to spray the pheromone during periods of actual insect mating. In any of the embodiments, preferably, the control circuit which is used is inexpensive to construct and inexpensive to operate. Preferably, the apparatus 10 or 210 is run on batteries and has a long life. In all the above embodiments, the use of the electronic control circuitry with the solenoid 32 activated ejector nozzle 28 or 216 allows the apparatus 10 or 210 to run efficiently on very low voltage and to operate very quietly.

IN USE

In the preferred embodiment, the electronic microdispensing apparatus 10 or 210 is used to automatically dispense a set amount of chemicals over a set amount of time in an outdoor setting in order to control insects. In the preferred embodiment, the fluid to be dispensed is a liquid pheromone. However, other insect controlling liquids such as pesticides or fungicides could also be used. The apparatus 10 or 210 could also be used in a number of different settings which require the automatic dispensing of a precise amount of fluid.

Figure 5:
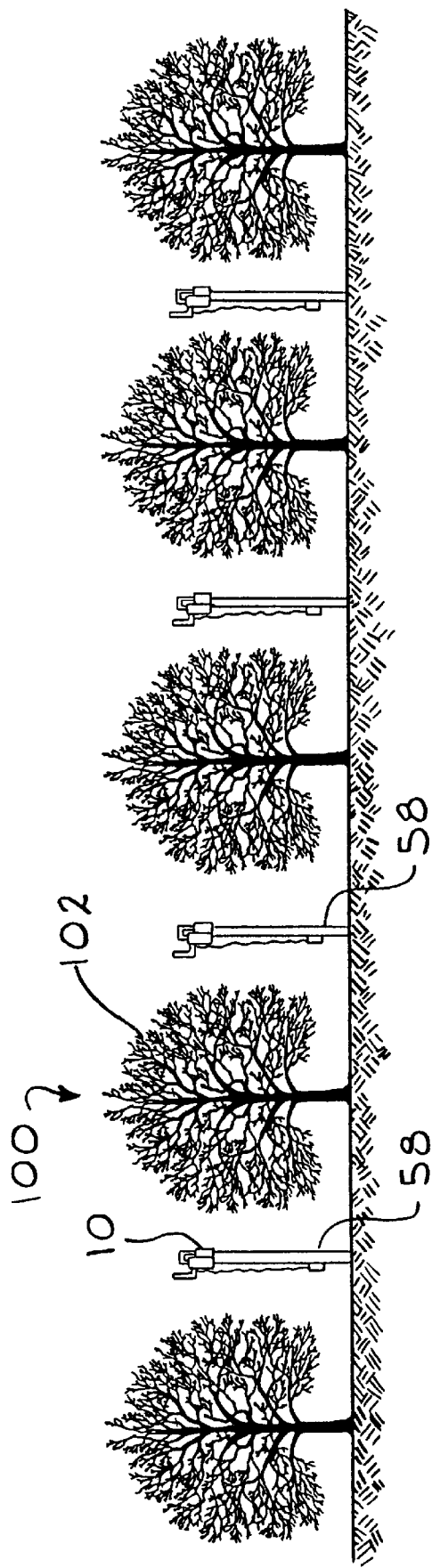
FIG. 5 is a front view showing use of the apparatus 10 in an orchard 100.

To use the apparatus 10 or 210 of either the first or second embodiment in an outdoor setting, such as an orchard 100, the containers 12 and 16 or container 212 of the apparatus 10 or 210 is preferably mounted on a pole 58 in the orchard 100 such that the ejector nozzle 28 is essentially level with the middle of the tree 102 (FIG. 5). In the preferred embodiment there are several apparatuses 10 or 210 spaced around the orchard 100. The number of apparatuses 10 or 210 depends on the amount of liquid dispensed by each apparatus 10 and the size of the area to be covered. Preferably, the apparatus 10 or 210 is able to disperse about <1 $\mu$L of the total amount of liquid and/or liquid and propellant in the can during each pulse. The low volume of dispersion allows the amount of liquid dispersed to be easily limited to very small volumes. This is important in the preferred embodiment due to the cost of the pheromone and the need for only small volumes of the pheromone to achieve insect control. In both the first and second embodiments, the control circuit box 35 of the apparatus 10 or 210 is preferably mounted at the bottom of the pole 58 such that a user can easily adjust the control circuit 34 or 42 if needed. In an alternate embodiment where several apparatuses 10 or 210 are controlled by a single computer 62, the control box 35 can be either with the apparatus 10 or 210 or at the bottom of the poles 58 as there is no need for the user to have easy access to the control circuit 34 (FIG. 7). When the apparatuses 10 or 210 are connected together and remotely controlled, cables 64 connecting the apparatuses 10 or 210 are mounted below the ground or above ground between the poles 58. In the alternate embodiment, where the apparatus 10 or 210 are radio controlled or controlled by satellite, the control box 35 can be with the apparatus 10 or anywhere else on the pole 58. In the preferred embodiment, the control circuit 34 or 42 is preconfigured so that the apparatus 10 or 210 ejects a pulse of the liquid having a set duration with a set time between each pulse. In the alternate embodiments, using radio control or a central computer 62, the control circuits 34 or 42 do not need to be preprogrammed but can be programmed after the apparatuses 10 or 210 are in place. In addition, in the second embodiment, the control circuit 34 or 42 can be mounted on the bottom of the container 212, making the apparatus 210 a single, self-contained unit. The second embodiment, having the single container 212, is very portable and is easily moved to provide spraying in different locations. In this embodiment, the container 212 does not need to be mounted on a pole 58.

It is intended that the foregoing description be only illustrative of the present invention and that the present invention be limited only by the hereinafter appended claims.

We claim:

1. A dispenser apparatus for controlled dispensing of a chemical in a liquid form periodically which comprises:
   (a) a sealed container means having an inlet and an outlet and which is configured to hold a pressurized gas and the chemical in the liquid form;
   (b) adaptor means mounted on the inlet which allows the pressurized gas to be provided in the container means;
   (c) a fuel injector nozzle connected to the outlet of the container means capable of periodically dispensing less than 1 μL of the chemical in the liquid form by the pressurized gas from the container means, wherein the fuel injector nozzle comprises:
     (1) a body with a passage therethrough;
     (2) a valve needle moveable in the passage of the body to open and close the passage;
     (3) a solenoid coil with electrical leads to the coil mounted on the body, so that the coil provides a continuous circuit surrounding the valve needle which is moved upon application of a current through the coil; and
     (4) a bias means mounted in the body which holds the valve needle in a closed position when the current is not applied through the coil; and
   (d) a control means which supplies current to the coil means to move the valve needle against the bias means to open the passage in the body of the fuel injector nozzle and allows the chemical in the liquid form to be dispensed periodically from the container means through the passage in the body of the fuel injector nozzle.

2. The apparatus of claim 1 which is portable so as to be moved by lifting the container means.

3. The apparatus of claim 1 wherein the adaptor means at the inlet is constructed so as to be connected to a supply of pressurized gas.

4. The apparatus of claim 1 wherein a gas supply means is connected by a conduit to the container means at the inlet means.

5. The apparatus of claim 4 wherein a control valve means is provided between the gas supply means and the container means which allows connection between the gas supply means and the container means without loss of the gas wherein the control valve means is closed until the connection is made.

6. The apparatus of claim 1 wherein the control means is a programmable processing unit which periodically activates the control means to supply current to the coil of the fuel injector nozzle to open the needle valve.

7. The apparatus of claim 6 wherein the processing unit is in a computer.

8. The apparatus of claim 6 wherein the processing unit is connected by wiring to the coil.

9. The apparatus of claim 1 wherein the control means has a remote electromagnetic wave transmitter controlling a receiver connected to the coil of the fuel injector nozzle on the container means which when activated by the transmitter allows current to flow to the coil thus moving the needle valve to open the passage in the fuel injector nozzle.

10. The apparatus of claim 9 wherein the transmitter is activated by a central processing unit.

11. The apparatus of claim 10 wherein the central processing unit is in a programmable computer.

12. The apparatus of claim 11 wherein the computer contains a program which allows current to periodically flow to the coil to move the needle means and thus open the passage of the fuel injector nozzle.

13. The apparatus of claim 1 wherein the control means is a programmable processing unit which periodically supplies current to the coil of the fuel injector nozzle to open the needle valve and wherein the processing unit is connected by wiring to the coil.

14. The apparatus of claim 1 wherein the control means has a remote electromagnetic wave transmitter controlling a receiver connected to the coil of the fuel injector nozzle on the container means which when activated by the transmitter allows current to flow to the coil thus moving the needle valve to open the passage in the fuel injector nozzle; wherein the transmitter is activated by a central processing unit; wherein the central processing unit is in a programmable computer; and wherein the computer contains a program which allows current to periodically flow to the coil to move the needle valve and thus open the passage of the fuel injector nozzle.

15. The apparatus of claim 14 wherein the transmitter produces radio waves.

16. A dispenser apparatus for controlled dispensing of a chemical in a liquid form periodically which comprises:
   (a) a sealed container means having an inlet and an outlet and which is configured to hold a pressurized gas and the chemical in the liquid form;
   (b) adaptor means mounted on the inlet which allows the pressurized gas to be provided in the container means;
   (c) a nozzle connected to the outlet of the container means, wherein the nozzle comprises:
     (1) a body with a passage therethrough;
     (2) a valve needle moveable in the passage of the body to open and close the passage;
     (3) a solenoid coil with electrical leads to the coil mounted on the body, so that the coil provides a continuous circuit surrounding the valve needle which is moved upon application of a current through the coil; and (4) a bias means mounted in the body which holds the valve needle in a closed position when the current is not applied through the coil; and (d) a control means which supplies current to the coil means to move the valve needle against the bias means to open the passage in the body of the nozzle and allows the chemical in the liquid form to be dispensed periodically from the container means through the passage in the body of the nozzle wherein the control means is a self-contained circuit which is mounted on the container means and supplies the current periodically to the coil means on a pre-programmed schedule.

17. The apparatus of claim 16 wherein the circuit has an activated mode which supplies current to the coil and an inactivated mode wherein no current is needed by the circuit.

18. The apparatus of claim 17 wherein the inactivated mode is controlled by a capacitor electrically connected to separate transistor gates, wherein the loss of a charge on the capacitor opens the gate of one of the transistors and allows current to flow from a battery to the coil.

19. A dispenser apparatus for controlled dispensing of a chemical in a liquid form periodically which comprises:

(a) a sealed container means having an inlet and an outlet and which is configured to hold a pressurized gas and the chemical in the liquid form;

(b) adaptor means mounted on the inlet which allows the pressurized gas to be provided in the container means;

(c) a nozzle connected to the outlet of the container means, wherein the nozzle comprises:
   (1) a body with a passage therethrough;
   (2) a valve needle moveable in the passage of the body to open and close the passage;
   (3) a solenoid coil with electrical leads to the coil mounted on the body, so that the coil provides a continuous circuit surrounding the valve needle which is moved upon application of a current through the coil; and
   (4) a bias means mounted in the body which holds the valve needle in a closed position when the current is not applied through the coil;

(d) a self-contained circuit mounted on the container means which supplies current periodically to the coil means on a pre-programmed schedule to move the valve needle against the bias means to open the passage in the body of the nozzle and allows the chemical in the liquid form to be dispensed periodically from the container means through the passage in the body of the nozzle; wherein the circuit has an actuated mode which supplies current to the coil and an inactivated mode where no current is provided by the circuit; and wherein the inactivated mode is controlled by a capacitor electrically connected to separate transistor gates, wherein the loss of a charge on the capacitor opens the gate of one of the transistors and allows current to flow from a battery to the coil; and (e) a gas supply means connected by a conduit to the container means at the inlet means, wherein a control valve means is provided between the gas supply means and the container means which allows connection between the gas supply means and the container means without loss of the gas wherein the control valve is closed while the connection is made; wherein the control means is a self-contained circuit which is mounted on the container means and supplies the current periodically to the coil means on a pre-programmed schedule.

20. A system for periodically dispensing a chemical in a liquid form over an area which comprises:

(a) multiple dispenser apparatus containing the chemical in the liquid form, each dispenser apparatus comprising a sealed container means and having an inlet and an outlet which can hold a pressurized gas and the chemical in the liquid form; adaptor means mounted on the inlet which allows the pressurized gas to be provided in the container; a fuel injector nozzle connected to the outlet of the container means capable of periodically dispensing less than 1 $\mu$L of the chemical in the liquid form by the pressurized gas, wherein the fuel injector nozzle comprises:
   (1) a body with a passage therethrough;
   (2) a valve needle moveable in the passage of the body to open and close the passage;
   (3) a solenoid coil with electrical leads to the coil mounted on the body so that the coil provides a continuous circuit surrounding the valve needle so that the needle is moved upon application of a current through the coil; and
   (4) bias means mounted in the body which holds the valve needle in a closed position when the current is not flowing through the coil;
control means which supplies current to the coil means to move the valve needle against the bias means to open the passage in the fuel injector nozzle and allow the chemical in the liquid form and the gas to be dispensed periodically from the container means through the passage in the body of the fuel injector nozzle; and (b) a central processing unit as part of the control means which controls each of the multiple dispenser apparatus so that each dispenser apparatus periodically dispenses the chemical in the liquid form from the fuel injector nozzle.

21. The system of claim 20 wherein each of the dispenser apparatus can be provided at different positions in the area and be controlled by the processing unit.

22. The system of any one of claims 20 or 21 wherein the central processing unit is in a computer.

23. The apparatus of claim 20 wherein the central processing unit of the control means is connected to an electromagnetic wave transmitter controlling a receiver connected to the coil of the fuel injector nozzle on each container means which when activated by the transmitter allows the current to flow to the coil thus moving the needle valve to open the passage in the fuel injector nozzle.

24. The apparatus of claim 23 wherein the central processing unit is in a programmable computer.

25. The apparatus of claim 24 wherein the computer contains a program which controls the periodic flow of current to the coil.

26. The apparatus of claim 23 wherein the transmitter produces radiofrequency waves.

27. A method for dispensing a chemical in a liquid form which comprise:

(a) providing a dispenser apparatus containing the chemical in the liquid form; the dispenser apparatus comprising a sealed container means having an inlet and an outlet and which can hold a pressurized gas and the chemical in the liquid form;
adaptor means mounted on the inlet which allows a pressurized gas to be provided in the container means;
a fuel injector nozzle connected to the outlet of the container means capable of periodically dispensing less than 1 $\mu$L of the chemical in the liquid form by the pressurized gas, wherein the fuel injector nozzle comprises:

(1) a body with a passage therethrough;
(2) a valve needle moveable in the passage of the body to open and close the passage; and
(3) a solenoid coil with electrical leads to the coil mounted on the body so that the coil provides a continuous circuit surrounding the valve needle which is moved upon application of a current through the coil; and
(4) bias means mounted in the body which holds the valve needle in a closed position when the current is not flowing through the coil; and control means which supplies current to the coil means to move the valve needle against the bias means to open the passage in the fuel injector nozzle so that the chemical in the liquid form and the gas are dispensed periodically from the container means through the passage in the body of the fuel injector nozzle.

28. The method of claim 27 wherein the control means is a programmable processing unit which periodically activates the control means to supply current to the coil of the fuel injector nozzle to open the needle valve.

29. The method of claim 28 wherein the processing unit is in a computer.

30. The method of claim 29 wherein the processing unit is connected by wiring to the coil.

31. The method of claim 27 wherein the control means has a remote electromagnetic wave transmitter controlling a receiver connected to the coil of the fuel injector nozzle on the container means which when activated by the transmitter allows current to flow to the coil thus moving the needle valve to open the passage in the fuel injector nozzle.

32. The method of claim 31 wherein the transmitter is activated by a central processing unit.

33. The method of claim 32 wherein the central processing unit is in a programmable computer.

34. The method of claim 33 where in the computer contains a program which controls the periodic flow of current to the coil to move the needle valve and thus open the passage of the fuel injector nozzle.

35. The method of claim 27 wherein the chemical in the liquid form is a pheromone which attracts insects which is dispensed in an area containing plants attacked by the insect to confuse the insects and prevent mating.

36. The method of claim 27 wherein the chemical in the liquid form is a fragrance which is dispensed in a closed area to control odors.

37. A method for dispensing a chemical in a liquid form which comprise:
   (a) providing a dispenser apparatus containing the chemical in the liquid form; the dispenser apparatus comprising a sealed container means having an inlet and an outlet and which can hold a pressurized gas and the chemical in the liquid form;
   adaptor means mounted on the inlet which allows a pressurized gas to be provided in the container means;
   a nozzle connected to the outlet of the container means, wherein the nozzle comprises:
      (1) a body with a passage therethrough;
      (2) a valve needle moveable in the passage of the body to open and close the passage; and
      (3) a solenoid coil with electrical leads to the coil mounted on the body so that the coil provides a continuous circuit surrounding the valve needle which is moved upon application of a current through the coil; and
      (4) bias means mounted in the body which holds the valve needle in a closed position when the current is not flowing through the coil; and
   self-contained circuit mounted on the container means which supplies current periodically to the coil means on a pre-programmed schedule; to move the valve needle against the bias means to open the passage in the nozzle so that the chemical in the liquid form and the gas are dispensed periodically from the container means through the passage in the body of the nozzle; and
   (b) activating the apparatus so that the chemical in the liquid form and the gas are dispensed periodically.

38. The method of claim 37 wherein the circuit has an activated mode which supplies current to the coil and an inactivated mode where no current is needed by the circuit.

39. The method of claim 38 wherein the inactivated mode is controlled by a capacitor electrically connected to separate transistor gates, wherein the loss of a charge on the capacitor opens the gate of one of the transistors and allows current to flow from a battery to the coil.

* * * * *